United States Patent [19]

Odawara et al.

[11] Patent Number: 5,062,099
[45] Date of Patent: Oct. 29, 1991

[54] INFORMATION PROCESSING APPARATUS

[75] Inventors: Kazuharu Odawara, Yokohama; Masaru Ishii, Fujisawa; Hiroshi Yamamoto, Yokohama, all of Japan

[73] Assignee: Kabushiki Kaisha Toshiba, Kawasaki, Japan

[21] Appl. No.: 336,142

[22] Filed: Apr. 11, 1989

[30] Foreign Application Priority Data

Apr. 11, 1988 [JP] Japan .................................. 63-88597

[51] Int. Cl.⁵ .............................................. G11B 23/00
[52] U.S. Cl. .................................. 369/263; 369/75.2; 369/77.1; 369/247; 369/258
[58] Field of Search ..................... 369/75.1, 75.2, 77.1, 369/77.2, 247, 258, 263

[56] References Cited

U.S. PATENT DOCUMENTS

| 4,455,637 | 6/1984 | Suzuki et al. | 369/263 X |
| 4,507,768 | 3/1985 | Ikedo et al. | 369/263 X |
| 4,628,498 | 12/1986 | Takamatsu et al. | 369/263 X |
| 4,695,996 | 9/1987 | Sugihara et al. | 369/263 X |
| 4,937,806 | 6/1990 | Babson et al. | 369/263 X |

FOREIGN PATENT DOCUMENTS

0148553A1 3/1984 European Pat. Off.
3627451A1 8/1986 Fed. Rep. of Germany.

Primary Examiner—William M. Shoop, Jr.
Assistant Examiner—David S. Martin
Attorney, Agent, or Firm—Finnegan, Henderson, Farabow, Garrett, and Dunner

[57] ABSTRACT

An information processing apparatus includes a casing having a loading slot through which a cartridge is inserted into and taken out of the casing. In the casing is arranged an information processing unit which has a drive base mechanism for information processing with an optical disc in the cartridge and a loading mechanism for loading and unloading the cartridge onto and from the drive base mechanism. The processing unit is elastically supported in the casing by a vibration insulating mechanism so that vibrations acting on the unit are absorbed. While a cartridge is being inserted into or taken out of the casing, the processing unit is locked at a specified position by a locking mechanism. When the cartridge is completely loaded onto the drive base mechanism, the locking mechanism releases the locked state of the unit.

13 Claims, 9 Drawing Sheets

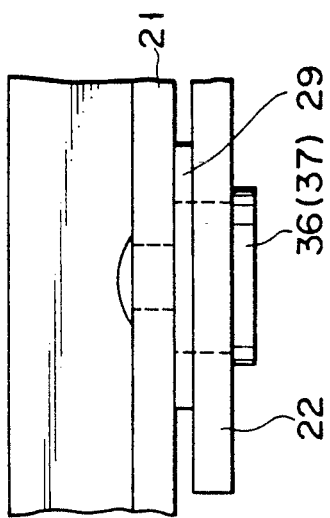
F I G. 4
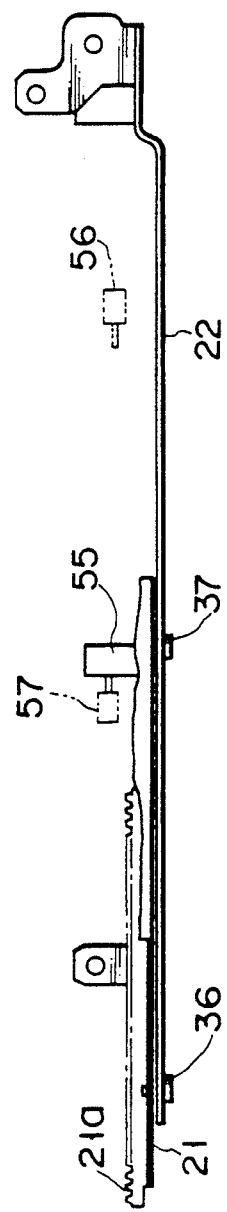
F I G. 5

INFORMATION PROCESSING APPARATUS

Background of the Invention

1. Field of the Invention

This invention relates to an information processing apparatus for using a cartridge containing therein an information storage medium such as an optical disc and performing information processing such as recording and reproduction of information on or from the information storage medium.

2. Description of the Related Art

Generally, information processing apparatuses of this type are provided with a casing having a cartridge loading slot, and, in the casing, there are provided an information processing unit including a loading mechanism and a drive base mechanism. This information processing unit is elastically supported by vibration insulating means formed of rubber vibration insulators which are somewhat hard so as to absorb a certain degree of extraneous vibrations. Therefore, even if the casing is subjected to great vibrations when the processing apparatus is being transported, for example, the information processing unit is protected from being damaged.

In recent years, however, there has been requirement for higher stability of information processing against extraneous vibrations. With vibration insulating means of the conventional type which uses a relatively hard vibration-damping rubber, minute vibrations occurring during information processing operations cannot be absorbed sufficiently, so that the above requirement cannot be met.

A possible solution is to use vibration insulating means made of soft rubber to absorb extraneous vibrations sufficiently. However, in this case, the stability of information processing against extraneous vibrations can be improved, but the information processing unit becomes subject to movement. Therefore, when for instance a cartridge is loaded or unloaded, the information processing unit and the casing are displaced with respect to each other, sometimes making it difficult to load or unload the cartridge smoothly. Moreover, when a great vibration is applied to the apparatus, e.g., in transit, the information processing unit may collide with the casing and be damaged.

SUMMARY OF THE INVENTION

The present invention has been made in consideration of the above situation and has as its object to provide an information processing apparatus which sufficiently absorbs extraneous vibrations during information processing and thereby improves the stability of information processing against vibrations, and wherein an information processing unit can be fixed when information processing is not under way, that is, when the apparatus is being transported or a cartridge is to be loaded or unloaded, thereby preventing the apparatus from malfunctioning and being damaged.

In order to achieve the above object, an information processing apparatus according to this invention comprises a casing having a loading slot through which an information storage medium is inserted into the casing; a processing unit having means for reproducing information recorded in the medium and means for loading the information storage medium, inserted into the casing through the loading slot, onto the reproducing means; means for elastically supporting the processing unit in the casing to absorb vibrations acting on the unit; and means for locking said unit at a specified position relative to the casing while an information storage medium is being loaded onto the reproducing means, and for releasing the unit from the locked state when the medium is completely loaded to the reproducing means.

With the apparatus constructed as described, the processing unit is locked at a specified position by the locking means when an information storage medium is to be loaded onto or unloaded from the reproducing means by the loading means. Therefore, when the apparatus is not processing information, that is, when an information storage medium is to be loaded or unloaded, or the apparatus is in transportation, the processing unit is fixed at the specified position with respect to the casing. This enables an information storage medium to be loaded and unloaded securely and prevents the apparatus from being damaged during transportation. Further, when the apparatus is processing information, that is, when an information storage medium is loaded to the reproducing means, the unit is automatically released from the locked state and comes into a condition wherein the unit is elastically supported by the vibration insulating means. As a result, extraneous vibrations propagating through the casing to the unit are securely absorbed by the vibration insulating means, making stable information processing possible.

BRIEF DESCRIPTION OF THE DRAWINGS

FIGS. 1 through 8 show an information processing apparatus according to an embodiment of the invention, in which;

FIG. 1 is a perspective view showing the apparatus and a cartridge used therewith;

FIG. 2 is a perspective view showing an essential part of the apparatus;

FIG. 3 is an exploded perspective view showing a loading mechanism;

FIG. 4 is a partially enlarged plan view of the loading mechanism;

FIG. 5 is a plan view showing a cam member and a guide member of the loading mechanism;

FIG. 6 is a plan view showing a drive mechanism of the loading mechanism;

FIG. 8 is a sectional view of a vibration insulating mechanism; and

DETAILED DESCRIPTION OF THE PREFERRED EMBODIMENTS

With reference to the accompanying drawings, an embodiment of this invention will be described.

Figure 1:
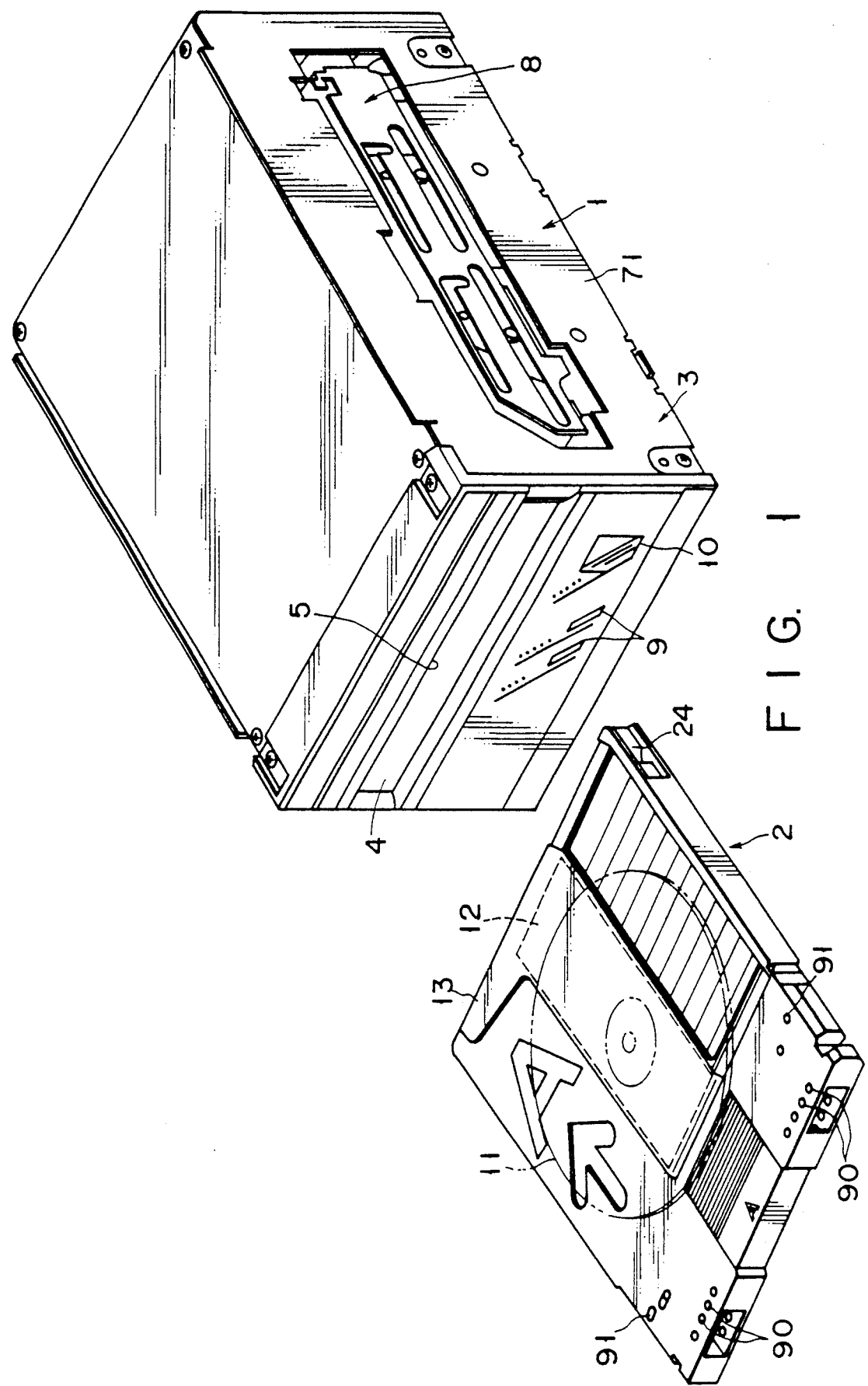

FIG. 1 shows the external appearance of optical disc apparatus 1 as an information processing apparatus of this invention and cartridge 2 which is handled on this apparatus.

Apparatus 1 comprises casing 3 having at the front panel thereof cartridge loading slot 5 which is opened and closed by shutter 4. In casing 3 are arranged information processing unit 8 including drive base mechanism 6 and loading mechanism 7 to be described later, and control circuit board 92 for driving unit 8. Display sections 9 to indicate the operating condition of apparatus 1 and eject switch 10 are provided at the lower right region of the front panel of casing 3.

Cartridge 2 contains therein optical disc which is 130 mm in diameter, for example, as an information storage medium. Both the sides A and B of optical disc 11 are usable for information processing. Cartridge 2 has window 12 to expose a part of disc 11 and slidable shutter 13 for opening and closing the window.

Figure 2:
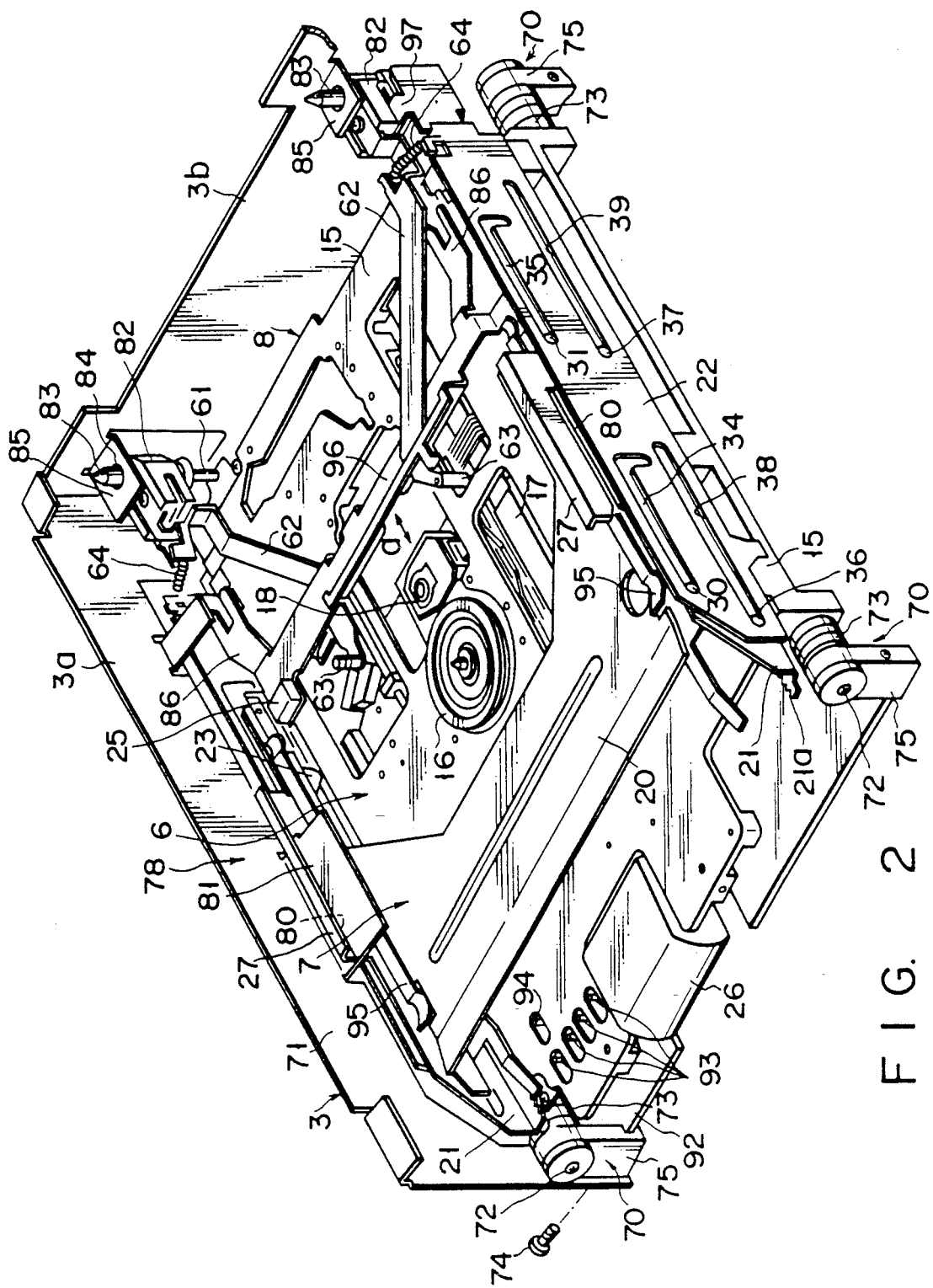

As is shown in FIG. 2, drive base mechanism 6 comprises a motor (not shown) having turntable 16 for supporting and rotating disc 11, optical head 18 for recording and reproducing information on and from the information recording layer on the underside of disc 11, and linear motor 17 for moving head 18 in the radial direction of disc 11. All those component parts of drive base mechanism 6 are mounted on substrate 15.

Figure 3:
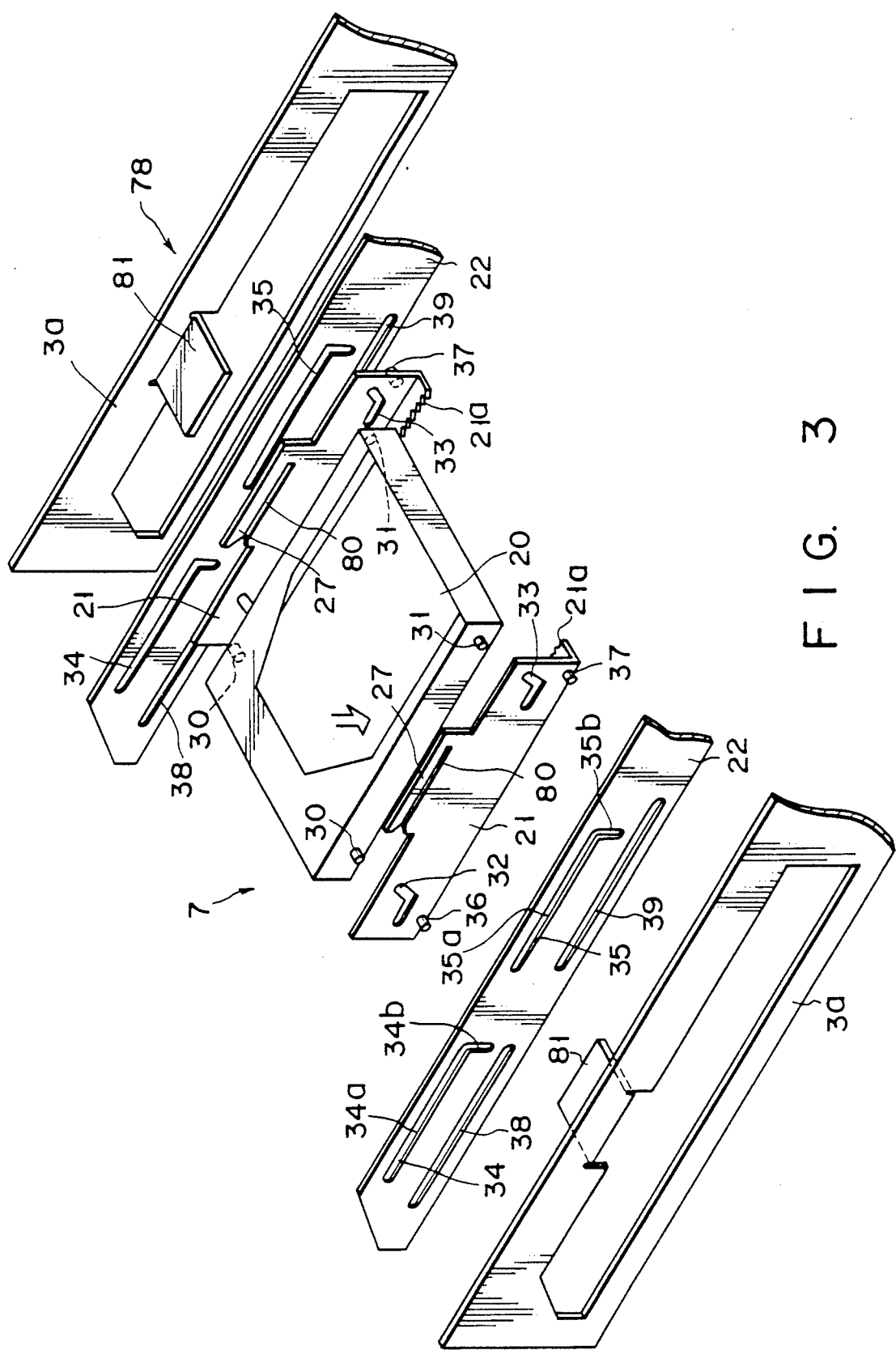
Figure 7A:
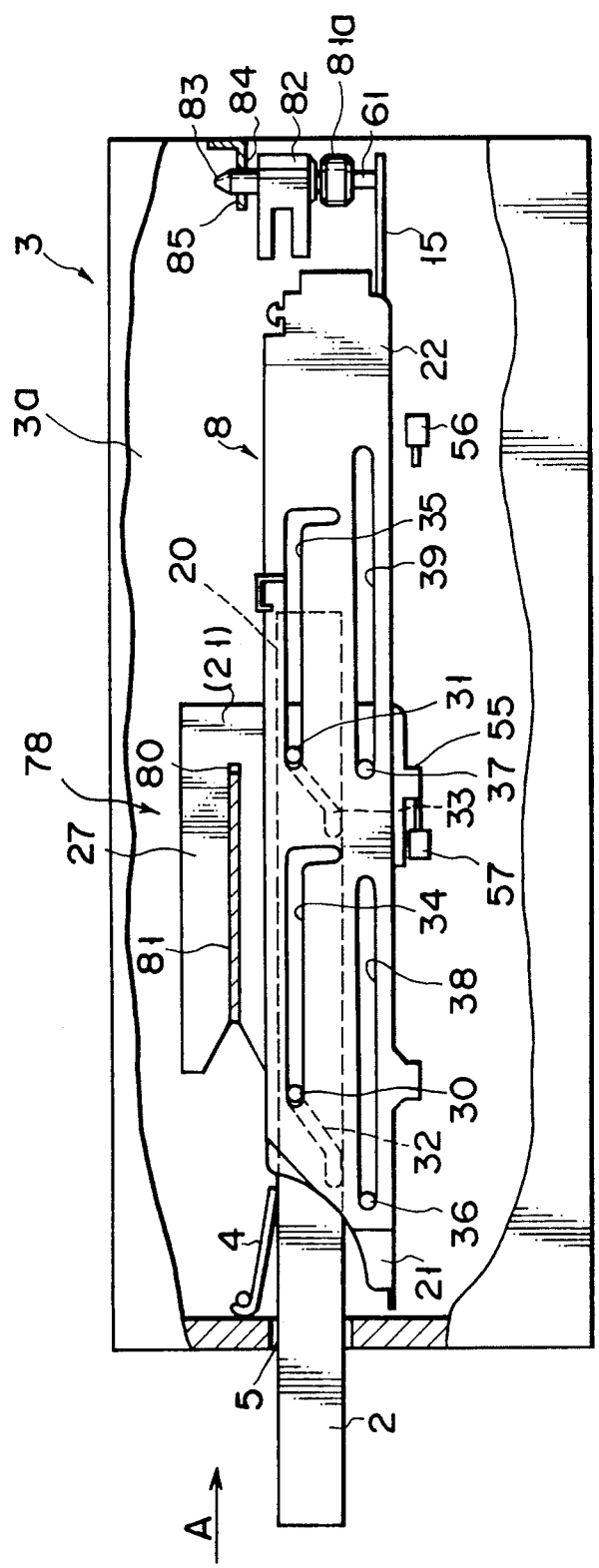
FIGS. 7A through 7C are side views of the apparatus in different operating conditions.

Referring to FIGS. 2, 3 and 7A, loading mechanism 7 is installed on substrate 15. Specifically, mechanism 7 includes cartridge holder 20 for receiving and holding cartridge 2 inserted into casing 3 through slot 5, and a pair of parallel cam plates 21 provided on the opposite sides of the holder. Mechanism 7 also comprises a pair of parallel guide plates 22 mounted upright on substrate 15 and located parallel to side walls 3a of casing 3. Holder 20 and cam plates 21 are arranged substantially horizontal between guide plates 22.

A pair of guide pins 30, 31 are provided on each lateral side of holder 20 mutually spaced apart in the horizontal direction. These guide pins are inserted into cam grooves 32 and 33 formed in cam plates 21, respectively. Each of the cam grooves has a horizontally extending portion and an inclined portion extending from the right end of the horizontal portion diagonally upwards. Each cam plate 21 is provided with a pair of guide pins 36 and 37 spaced apart horizontally and protruding towards guide plate 22. In addition, each cam plate 21 has protrusion 27 extending upward from the top edge of plate 21, and slit 80 formed in protrusion 27. Slit 80 extends horizontally and opens toward loading slot 5.

Each guide plate 22 is formed with a pair of first guide grooves 34, 35 and a pair of second guide grooves 38, 39. Each of the first guide grooves has horizontal portion 34a (35a) and vertical portion 34b (35b) which extends from the right end of the horizontal portion vertically downwards. Second guide grooves 38 and 39 are located below first guide grooves 34 and 35, respectively, and extend horizontally. Guide pins 36 and 37 of each cam plate 21 are inserted into second guide grooves 38 and 39 of corresponding guide plate 22, respectively. Therefore, cam plates 21 are supported by guide plates 22 and guided by guide grooves 38 and 39 to be movable horizontally, that is, in the inserting direction of cartridge 2. Guide pins 30 and 31 of holder 20 pass through cam grooves 32 and 33 of cam plates 21 and are inserted into first guide grooves 34 and 35 of corresponding guide plates 22, respectively. Therefore, holder 20 is moved along first guide grooves 34 and 35 as cam plates 21 are moved.

Referring to FIG. 4, each of guide pins 36 and 37 of cam plates 21 has a head with a diameter larger than the width of second guide grooves 38 and 39 of guide plates 22. Each guide pin is inserted from the outer side of guide plate 22 into the second guide groove and caulked at inside the cam plates. Spacer 29 is wound around the guide pin and interposed between cam plate 21 and guide plate 22. Therefore, in assembling an apparatus, cam plates 21 and guide plates 22 can be handled as assembled parts, thereby reducing assembly time.

Figure 6:
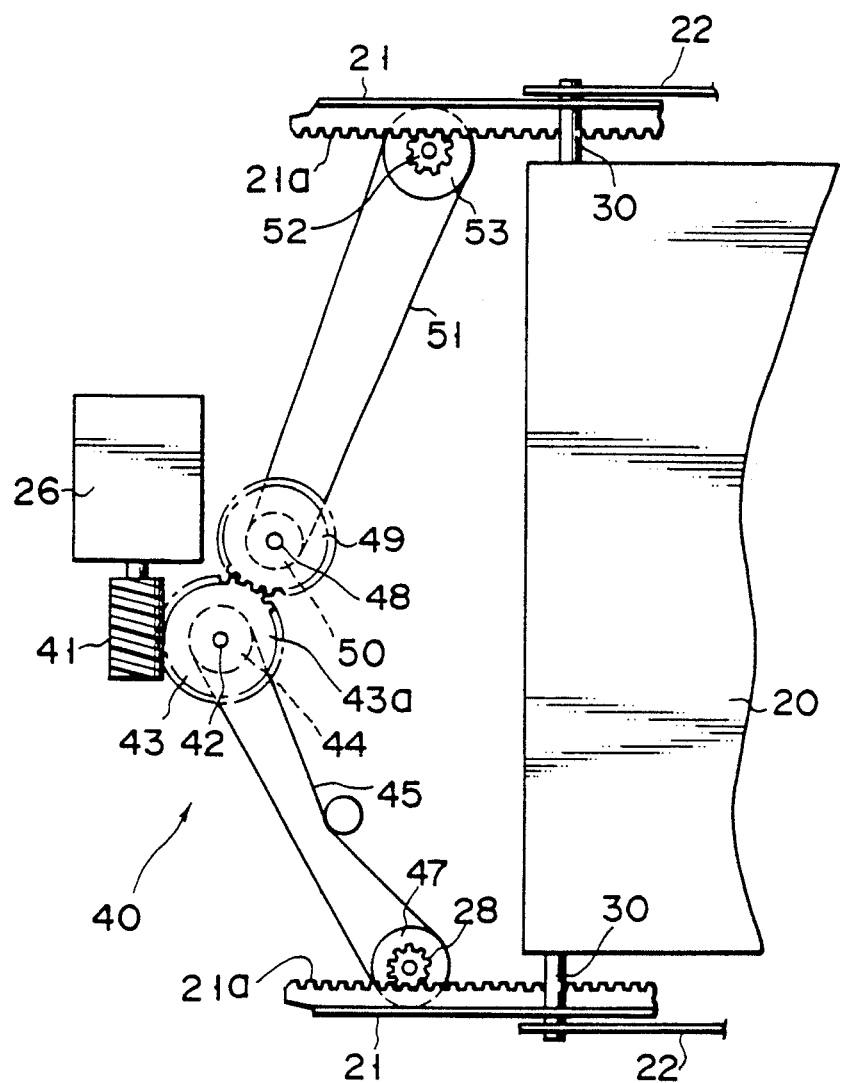

As is shown in FIGS. 5 and 6, the lower end portion of each cam plate 21 is bent 90 degrees towards holder 20 and rack 21a is formed at the edge of the bent portion. Cam plates 21 are driven in the horizontal direction by cam plate drive mechanism 40 of loading mechanism 7. Drive mechanism to includes loading motor 26 fixed on substrate 15, and worm gear 41 is fixed to the rotational shaft of the motor. Worm gear 41 engages with worm wheel gear 43 which is mounted on substrate 15 rotatably around pin 42. Pulley 44 is fixed to gear 43. Pinion 28 is rotatably mounted on substrate 15 and engages with rack 21a of one of cam plates 21. Pulley 47 is fixed to pinion 28, and endless belt 45 is stretched between pulleys 47 and 44.

Gear 49 is mounted on substrate 15 to be rotatably around pin 48. This gear engages with gear portion 43a of worm gear wheel 43. Gear 49 has integrally pulley 50. Pinion 52 engaging with rack 21a of the other cam plate 21 is rotatably mounted on substrate 15. Pinion 52 integrally has pulley 53, and endless belt 51 is stretched between pulleys 53 and 50.

Therefore, when motor 26 is rotated in the forward or reverse direction, cam plates 21 are moved at the same speed in the same direction.

The operation of loading mechanism 7 constructed as described will be described.

When the apparatus is not processing information, that is, when cartridge 2 is not loaded in apparatus 11, holder 20 is located in the home position as indicated in FIG. 7A. Under this condition, holder 20 substantially faces loading slot 5. Guide pins 30 and 31 of holder 20 are located at the left ends of horizontal portions 34a and 35a of first guide grooves 34 and 35 of guide plates 22 and are located at the top ends of the inclined portions of cam grooves 32 and 33, respectively. Guide pins 36 and 37 of cam plates 21 are located at the left ends of second guide grooves 38 and 39.

Referring to FIG. 2, snappers 23, each consisting of a plate spring, are attached to the lateral sides of holder 20, while holder 20 is located at the home position, when cartridge 2 is manually inserted into holder 20 through inserting slot 5 in the direction of arrow A, snapper receivers 24 (FIG. 1) formed on the lateral sides of the cartridge elastically engage with snappers 23. Thus, cartridge 2 is held in holder 20. Detector switch 25 for detecting the insertion of cartridge 2 is provided at the proximal end of holder 20. When cartridge 2 is inserted into holder 20, switch 25 is turned on as its actuator is pushed by the cartridge. Thus, switch 25 detects that cartridge 2 has been correctly inserted in holder 20.

Figure 7B:
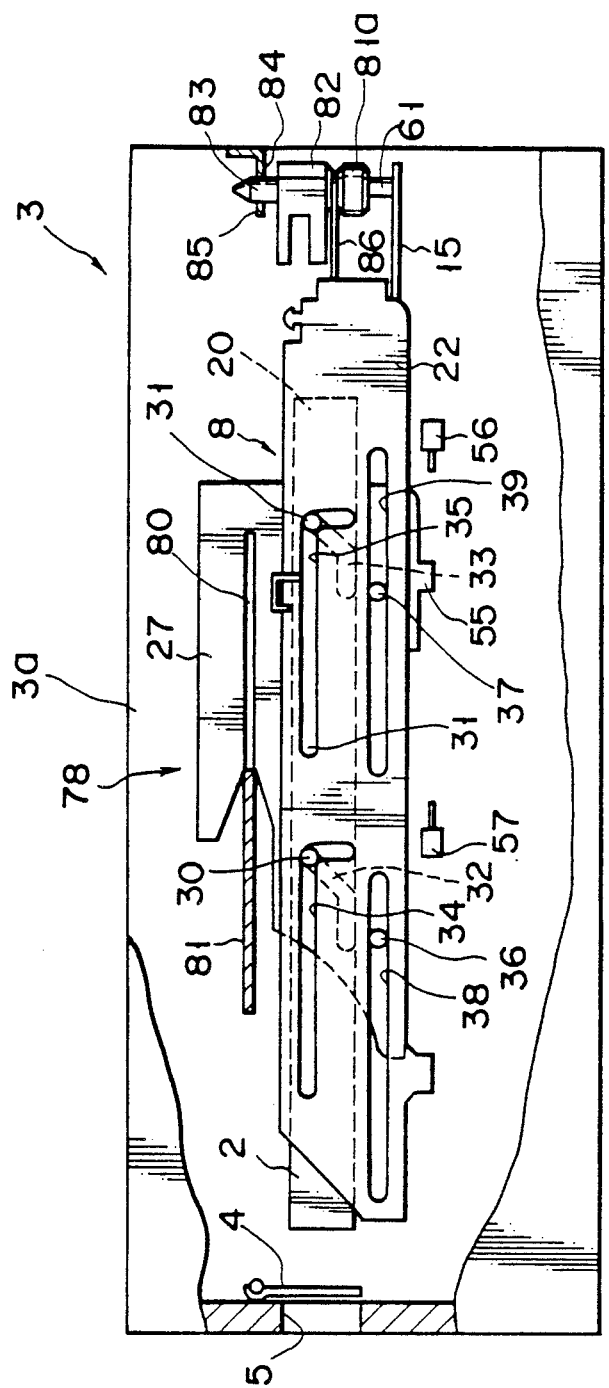

In response to a detection signal from switch 25, motor 26 of cam plate drive mechanism 40 is rotated in the forward direction. Therefore, a pair of cam plates 21 are moved in the direction of arrow A as is shown in FIG. 7B. Cam plates 21 are moved horizontally while guide pins 36 and 37 are guided by guide grooves 38 and 39 of guide plates 22. Likewise, holder 20 is moved horizontally integral with cam plates 21 while guide pins 30 and 31 are guided by horizontal portions 34a and 35a of first guide grooves 34 and 35. When guide pins 30 and 31 reach the right ends of the horizontal portions of guide grooves 34 and 35, that is, when holder 20 reaches the pushed-in position as illustrated in FIG. 7B, the holder cannot move horizontally any longer and only cam plates 21 continue the horizontal movement.

Figure 7C:
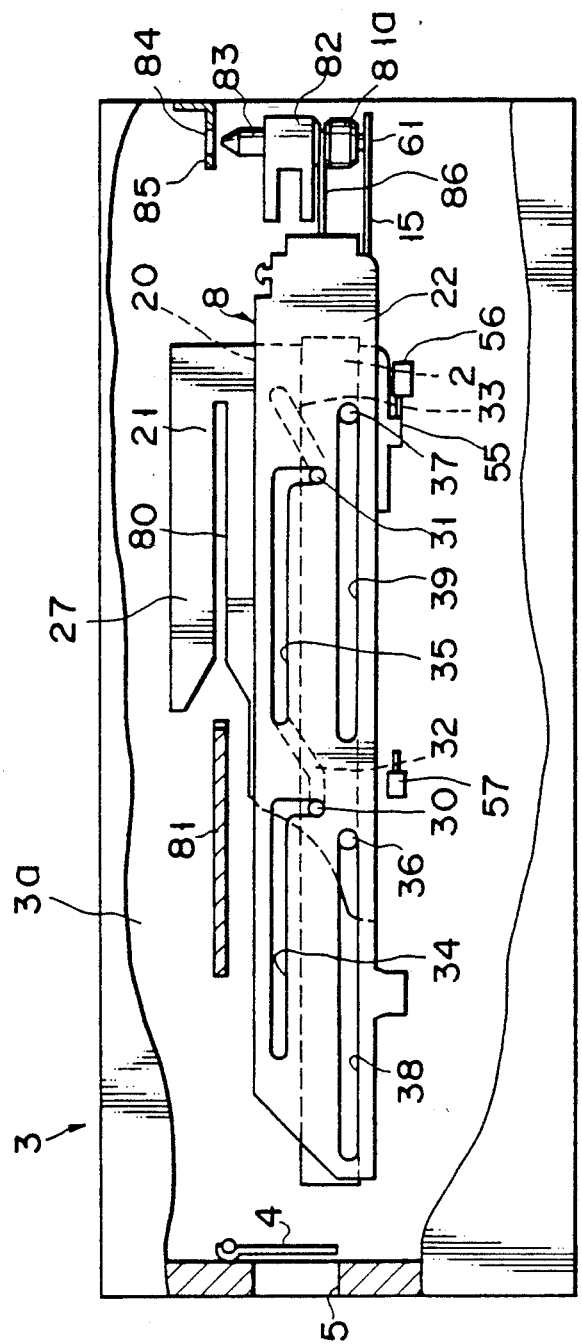

When cam plates 21 are further moved in the direction of arrow A after holder 20 has reached the pushed-in position, guide pins 30 and 31 of holder 20 are pushed downwardly by the action of cam grooves 32 and 33 of cam plates 21. Therefore, guide pins 30 and 31 go down along vertical portions 34b and 35b of first guide grooves 34 and 35 of guide plates 22 and are positioned at the bottom ends of the vertical portions. Thus, as shown in FIG. 7C, holder 20 moves from the pushed-in position to the end position of descent. Cartridge 2 in holder 20 is now loaded on drive base mechanism 6. In other words, optical disc 11 in cartridge 2 is mounted on turntable 16.

Thereafter, cam plates 21 move a little further in the direction of arrow A, causing projection 55 of the cam plate to turn off loading stop switch 56. In response to this, motor 26 of drive mechanism 40 is stopped by which the loading of cartridge 2 is completed.

Cartridge 2 is to be unloaded or ejected by pressing eject switch 10 on casing 3. As eject switch 10 is pressed, motor 26 of drive mechanism 40 is rotated in the reverse direction and cam plates 21 are moved in the direction opposite to the arrow A direction. Thus, the above-described loading procedure is reversed, and holder 20 is moved from the descent position back to the home position as is shown in FIG. 7A. Then, cartridge 2 is manually pulled out from casing 3 through loading slot 5.

Loading mechanism 7 includes shutter open/close mechanism 60 by which shutter 13 of cartridge 2 is opened during holder 20 moves from the home position to the pushed-in position.

As is shown in FIG. 2, open/close mechanism 60 includes a pair of open/close arms 62. The proximal end of each arm is supported to be rotatable in a horizontal plane by support pin 61 mounted upright at the rear end of substrate 15. Each arm 62 is provided at its distal end with engaging pin 63 which is engageable with a notch (not shown) formed in shutter 13 of cartridge 2.

When cartridge 2 is inserted into holder 20, engaging pin 63 of one arm 62 engages with the corresponding notch of the cartridge. When, under this condition, holder 20 is moved from the home position to the pushed-in position, one arm 62 mentioned above is pushed by the holder and rotates against the urging force of arm return spring 64, thereby opening shutter 13. When cartridge 2 is inserted into holder 20 with the other side up, shutter 13 is opened by the other arm 62.

Shutter 13 is fully opened before holder 20 starts to descend from the pushed-in position to the descent position. Therefore, when holder 20 reaches the descent position, disc 11 in cartridge 2 is mounted on turntable 16 and optical head 18 gets into window 12 of the cartridge to face the disc. In this condition, it is possible to perform recording and reproduction of information in and from disc 11.

In the ejection of cartridge 2, open/close mechanism 60 closes shutter 13 in a manner reverse to the shutter opening actions. Then, a projection of an elastic lever, not shown, engages into a lock aperture of shutter 13 to keep the shutter closed.

Thus-constructed information processing unit 8 including drive base mechanism 6 and loading mechanism 7 has a vibration insulating structure. Particularly, unit 8 is elastically supported in casing 3 to insulate unit 8 from extraneous vibrations.

Figure 8:
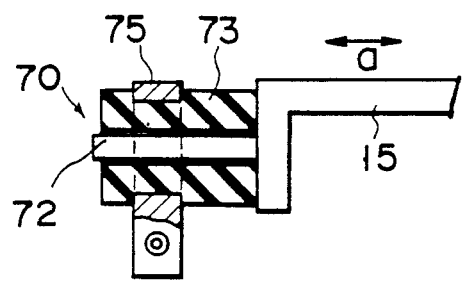

As is shown in FIGS. 2 and 8, the four corners of substrate 15 are supported by side walls 3a of casing 3 by means of four elastic support units 70 serving as vibration insulating means. Each support unit 70 includes support shaft 72 extending horizontally from the end of substrate 15 and in parallel with the moving direction a of optical head 18, and cylindrical rubber vibration insulator 73. Support shaft 72 is inserted into the inner hole of insulator 73. Holder 75 is fitted around the outer periphery of the distal end portion of vibration insulator 73 and fixed to side wall 3a of casing 3 by holder screw 74. Therefore, information processing unit 8 is elastically supported by rubber vibration insulators 73 and insulated by those vibration insulators from extraneous vibrations.

According to this embodiment, rubber vibration insulator 73 of each vibration insulating unit 70 is supported by support shaft 72 so that the axis of vibration insulator 73 coincides with the access direction a of optical head 18. At the same time, each insulator 73 is fixed to casing 3 by means of holder 75 extending in the radial direction of insulator 73. In this manner, rubber vibration insulators 73 elastically support information processing unit 8 in such a way that the vibration absorption capacity in the head access direction a is greater than that in the direction perpendicular to direction a.

Consequently, unit 70 can efficiently absorb the extraneous vibrations in the head access direction a detrimental to apparatus 1 and can also absorb extraneous vibrations in the direction perpendicular to the access direction, that is, in the vertical direction.

If unit 8 is elastically supported by the vibration insulating means in the manner described above, during the information processing operation of the apparatus, that is, when cartridge 2 is mounted on base drive mechanism 6, the vibration of the drive base mechanism is absorbed, thus assuring stable information processing. On the other hand, since loading mechanism 7 is also supported elastically, a problem arises as described below. In short, when cartridge 2 is to be loaded or unloaded, the loading mechanism is displaced as it is subjected to extraneous vibrations and therefore it does not correctly face to inserting slot 5 of casing 3, thereby making it impossible to load or unload cartridge 2.

According to this embodiment of the invention, there is provided locking mechanism 78 for locking information processing unit 8 at a specified position with respect to casing 3 when cartridge 2 is to be loaded or unloaded.

As is shown in FIGS. 2, 3 and 7A through 7C, locking mechanism 78 includes protrusion 27 formed at the top end of each cam plate 21 and having slit 80 extending horizontally, and lug 81 projecting from each side wall 3a of casing 3 and engageable into slit 80. Lug 81 is formed by cutting and bending a part of side wall 3a horizontally to direct it to holder 20. As is shown in FIGS. 7A and 7B, these lugs 81 are positioned such that they engage with slits 80 of corresponding protrusions 27 while holder 20 is located between the home position and the pushed-in position, and such that they come out of slits 80 when holder 20 is located at the descent position. Therefore, when cartridge 2 is to be loaded or unloaded, that is, when holder 20 is located between the home position and the pushed-in position, lugs 81 engage in slits 80, thereby preventing information processing unit 8 from moving vertically.

Locking mechanism 78 further comprises a horizontal restricting mechanism for restricting the horizontal movement of unit 8, in addition to the above-mentioned vertical restricting mechanism for restricting the vertical movement of unit 8. As described above, a pair of support pins 61 are provided upright at the rear end of substrate 15. Arm holder 82 is fitted on each pin 61 to be vertically movably along pin 61 and rotatably around it. The proximal end of each arm 62 of the earlier-described shutter open/close mechanism 60 is fixed to corresponding arm holder 82. Each holder 82 has projection 83 extending upwards.

A pair of bent lugs 85 are formed at rear wall 3b of casing 3 so as to opposite to arm holders 82. Each bent lug 85 extends from rear wall 3b horizontally towards cartridge holder 20 and includes through-hole 84. Each arm holder 82 includes rubber ring 81a elastically engaged with support pin 61. As is shown in FIGS. 7A and 7B, arm holders 82 are held at an upper position by the engagement between rubber ring 81a and support pin 61 while holder 20 is located between the home position and the pushed-in position. Projections 83 of arm holders 82 are fitted into through-holes 84 of corresponding lugs 85 respectively, thereby preventing information processing unit 8 from moving horizontally.

A pair of holder elevation lugs 86 extend from the rear end of cartridge holder 20 towards rear wall 3b of casing 3. As is shown in FIG. 7B, when holder 20 moves from the home position to the pushed-in position, the extending ends of elevation lugs 86 engage with corresponding arm holders 82. If, under this condition, holder 20 descends to the descent position, arm holders 82 go down as they are pushed by elevation lugs 86. Therefore, projections 83 of arm holders 82 come out of through-holes 84 of lugs 85, thereby allowing information processing unit 8 to move horizontally.

Upon ejection of cartridge 2, when holder 20 rises from the descent position to the pushed-in position, arm holders 2 are pushed up by elevation lugs 86. Therefore, projection 83 engage into through-holes 84, thereby preventing the horizontal movement of information processing unit 8 again.

As described above, while apparatus 1 is in non-operating condition, that is, cartridge holder 20 is located between the home position and the pushed-in position, information processing unit 8 is prevented from moving vertically and horizontally. Specifically, holder 20 is locked in a specified position, that is, in a position where holder 20 securely face cartridge loading slot 5 of casing 3. When apparatus 1 is in the information processing operation, that is, when holder 20 is moved to the descent position and cartridge 2 is mounted on base drive mechanism 6, information processing unit 8 is unlocked and supported to be elastically displaceable by vibration insulating means 70. The locking and unlocking of unit 8 take place in synchronous operation with the loading and unloading operations of cartridge 2.

Since unit 8 is locked in the specified position when apparatus 1 is not processing information, cartridge 2 can be securely inserted into and ejected from holder 20. It is also possible to prevent an inadvertent displacement of unit 8 during transportation of the apparatus. Therefore, the apparatus can be prevented from being damaged by a collision of unit 8 with casing 3. Further, since unit 8 is leased from the locked state when the apparatus processes information, extraneous vibrations can be sufficiently absorbed by vibration insulating means 70 and the stability of the information processing operations against vibrations can thereby be improved.

As is shown FIGS. 1 and 2, cartridge 2 includes ID holes 90, four each for the A and B sides, which indicate the characteristics of disc 11, and light protector holes 91. On the other hand, apparatus 1 is provided with ID hole sensors 93 and protector hole sensor 94, which correspond to ID holes 90 and light protector holes 91, respectively. These sensors 93 and 94 are provided on control circuit board 92 connected to the motor having turntable 16.

In FIGS. 1 and 2, numeral 95 denotes cartridge holding springs on holder 20, and numeral 96 denotes arm guide to guide open/close arms 62 of shutter open/close mechanism 60.

Figure 9:
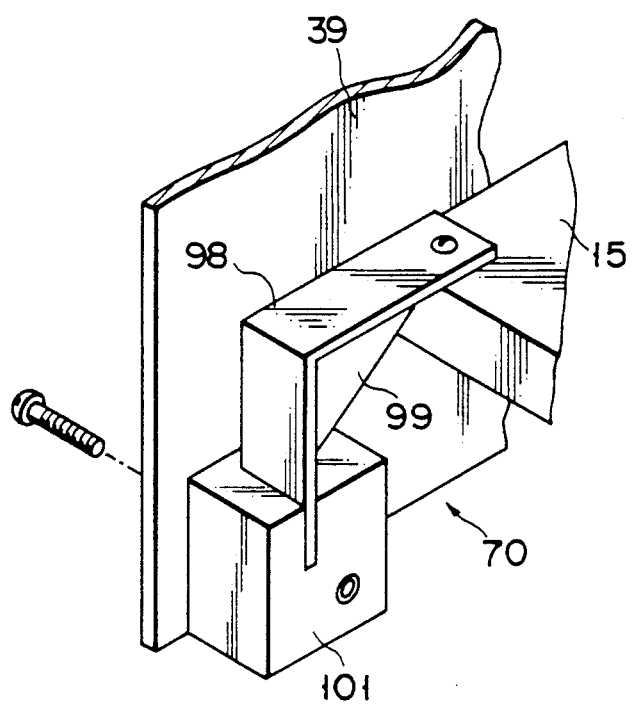
FIG. 9 is a perspective view showing a modification of the vibration insulating mechanism.

This invention is not limited to the above-mentioned embodiment but may be embodied in various forms within the scope of the invention. For example, elastic support units 70 may be configured in a modified form shown in FIG. 9 other than shown in the above embodiment. According to this modification, unit 70 includes L-shaped plate spring 98 and a triangle cushioning member 99 attached to the inside of the bent part of the plate spring. One end portion of plate spring 98 is fixed to substrate 15 by a screw and extends generally horizontally. The other end portion is screwed through holder 101 to side wall 3a of casing 3. Elastic support units 70 constructed a described can effciently absorb horizontal and vertical extraneous vibrations transferred through substrate 15.

What is claimed is:

1. An information processing apparatus comprising:
   a casing having a loading slot through which an information storage medium may be inserted;
   a processing unit arranged in said casing and including means for reproducing information recorded on the information storage medium, and means for loading the information storage medium, when it is inserted into said casing through the loading slot, onto said reproducing means, said loading means including a medium holder for holding the information storage medium therein, and guide means for guiding said medium holder between a home position where the information storage medium can be inserted and taken out of said holder through the loading slot and a descent position where the information storage medium in said holder is loaded onto said reproducing means, said guide means guiding said medium holder between the home position and the descent position by way of a pushed-in position where the information storage medium held by said holder is received into the casing;
   means for elastically supporting said processing unit in said casing to absorb vibrations acting on said processing unit; and
   locking means for locking said processing unit in a locked state at a specified position while the information storage medium is being loaded onto said reproducing means and for releasing said processing unit from the locked state when the information storage medium is completely loaded onto said reproducing means, said locking means including a first engagement portion provided at said guide means, and a second engagement portion provided at said casing for engagement with said first engagement portion, while said holder is located between the home position and the pushed-in position, in order to lock said reproducing means in the locked state.

2. An apparatus according to claim 1, wherein the information storage medium has a surface, and said locking means includes first restricting means for restricting movement of said processing unit in a direction perpendicular to the information storage medium, and said first and second engagement portions constitute said first restricting means.

3. An apparatus according to claim 2, wherein said guide means includes a moving member movable between a first position and a second position in synchronism with movement of said holder between the home position and the pushed-in position, and said first engagement portion is provided at said moving member.

4. An apparatus according to claim 2, wherein said locking means includes second restricting means for restricting movement of said processing unit in a direction parallel to the surface of the information storage medium, said second restricting means including a third engagement portion provided at said casing and a fourth engagement portion provided at said reproducing means for engaging with said third engagement portion while said holder is located between the home position and the pushed-in position.

5. An apparatus according to claim 18, wherein the home position and the pushed-in position of said holder are spaced from each other in the direction parallel to the storage medium inserted into the holder, and said descent position is separated from said pushed-in position in the direction perpendicular to the medium, and wherein the first and second positions of said moving member are spaced apart in the direction parallel to the storage medium inserted into the holder.

6. An apparatus according to claim 5, wherein said engagement portion of the moving member includes a slit extending parallel to the storage medium inserted into the holder, and said engaging member includes an engaging lug extending parallel to the medium inserted into the holder.

7. An apparatus according to claim 4, wherein the home position and the pushed-in position of said holder are spaced from each other in the direction parallel to the storage medium inserted into the holder, and said descent position is separated from the pushed-in position in the direction perpendicular to the storage medium, and wherein the first and second positions of said moving member are spaced from each other in the direction parallel to the storage medium inserted into the holder.

8. An apparatus according to claim 7, wherein said second engagement portion includes an engage hole having an axis extending in the direction perpendicular to the storage medium inserted into the holder, and said second engaging member is arranged to be movable between an engaging position where it engages with the engage hole and a release position where it is disengaged from the engage hole.

9. An apparatus according to claim 8, wherein said second restricting means includes an elevation member provided at the holder so as to engage with the second engaging member when the holder is moved to the pushed-in position, whereby said second engaging member is moved between the engage position and the release position by the elevation member in synchronism with the movement of the holder between the pushed-in position and the descent position.

10. An apparatus according to claim 1, wherein said reproducing means comprises a reproducing head movable in a direction parallel to the storage medium loaded on the reproducing means, and said vibration insulating means includes a plurality of vibration insulating units arranged between the processing unit and the casing, each of the vibration insulating units having a first vibration absorption property for absorbing vibrations in the moving direction of the reproducing head and a second vibration absorption property for absorbing vibrations in a direction perpendicular to the moving direction of the head.

11. An apparatus according to claim 10, wherein said first vibration absorption property is higher than the second vibration absorption property.

12. An apparatus according to claim 11, wherein each of said vibration insulating units comprises a support member extending from the processing unit in the moving direction of the head, a cylindrical elastic member fitted on the support member while the support member is inserted into an inner hole of the elastic member, and a holding member fixed to the casing, secured to the outer periphery of the elastic member and extending from the elastic member in a direction substantially perpendicular to the support member.

13. An apparatus according to claim 10, wherein each of said vibration insulating units comprises an L-shaped plate spring which has a first portion fixed to the processing unit and extending in the moving direction of the head, and a second portion extending perpendicular to the first portion; a cushioning material fixed to the inside of the bent part of the plate spring; and a holding member fixed to the second portion and also attached to the casing.

* * * * *

UNITED STATES PATENT AND TRADEMARK OFFICE
CERTIFICATE OF CORRECTION

PATENT NO. : 5,062,099
DATED : October 29, 1991
INVENTOR(S) : Kazuharu Odawara et al.

It is certified that error appears in the above-identified patent and that said Letters Patent is hereby corrected as shown below:

Claim 5, column 9, line 22, change "18" to --3--.

Signed and Sealed this

Fourth Day of May, 1993

Attest:

MICHAEL K. KIRK

Attesting Officer    Acting Commissioner of Patents and Trademarks